United States Patent [19]
Odenbach et al.

[11] Patent Number: 5,558,459
[45] Date of Patent: Sep. 24, 1996

[54] WAVE SUPPRESSION MEANS FOR LARGE WAVES

[76] Inventors: Peter W. Odenbach, P.O. Box 1355, Monument, Colo. 80132; Dale Kieffer, FAOCAGRTG, Via delle Terme di Caracalla, Rome, Italy, 00100

[21] Appl. No.: 387,447

[22] Filed: Feb. 13, 1995

(Under 37 CFR 1.47)

[51] Int. Cl.$^6$ .................... E02B 3/04; E02B 3/06
[52] U.S. Cl. .................... 405/21; 405/26
[58] Field of Search .................... 405/21, 26, 28, 405/27, 22, 52; 114/266, 267

[56] References Cited

U.S. PATENT DOCUMENTS

| | | | |
|---|---|---|---|
| 226,663 | 4/1880 | Kirkup | 405/26 |
| 3,755,829 | 9/1973 | Walklet | 4/172 |
| 3,886,602 | 6/1975 | Stanwood | 4/172 |
| 4,894,873 | 1/1990 | Kiefer et al. | 4/497 |

*Primary Examiner*—David J. Bagnell
*Assistant Examiner*—Tara L. Mayo
*Attorney, Agent, or Firm*—Titus & McConomy

[57] ABSTRACT

A wave suppression device, for use in suppressing large waves formed by ships, tides and wind and for use in harbor and marina areas and the demarcation of swimming areas, comprised of a cylindrical core having a plurality of fins radially extending from its outer surface. The fins are positioned substantially coextensively along the length of the core. Two disc members are circumferentially positioned substantially perpendicular about and connected to each end of the core member and fins. An opening in the core provides a means for introducing water to the hollow interior area of the assembly to provide a desired buoyancy, which opening interacts with a plug top provide a water-tight seal. The flotation assembly includes a central axial opening for receiving a cable or like device for stringing a plurality of wave suppression devices together to form a lane demarcation. A tube is located within this central axial opening, and the end of this opening contain threaded areas for receiving a bushing which secures the tube within this opening and can also secure the assembly to the cable or like stringing device.

5 Claims, 5 Drawing Sheets

WAVE SUPPRESSION MEANS FOR LARGE WAVES

FIELD OF THE INVENTION

The present invention relates a means for suppressing waves and, in particular, to large waves formed in or adjacent to harbor and marina areas by natural or man-made forces.

BACKGROUND OF THE INVENTION

The use of wave suppressors is generally well known. For example in U.S. Pat. No. 3,304,560 a turbulence reducing device is shown in which a plurality of lattice devices are strung the length of the swimming pool. Float means are attached to the ends of each of the devices to maintain buoyancy if the device is formed of a nonbuoyant material. This suppressor was one of the earliest attempts to suppress wave transmission between swimming lanes.

Numerous other devices have also been proposed to better suppress turbulence in competitive swimming pools, e.g., U.S. Pat. Nos. 3,540,063; 3,755,829; 3,786,521; 4,048,677 and 4,052,755. In general, these "racing lanes" consist of a plurality of elements strung on a cable that extends the length of the pool and define the boundaries of the swimming lanes. Each element is configured as a particular axially symmetric shape designed to suppress or inhibit the propagation of waves generated by a swimmer into the lane of another swimmer. Of these, U.S. Pat. No. 3,755,829 has found commercial success in the marketplace.

Another such device of particular interest is disclosed in U.S. Pat. No. 3,886,602. The device disclosed has a plurality of discs positioned perpendicular to the cable and is manufactured from a foamed plastic so that each element is capable of floating without separate flotation means. This device overcame many of the objections of the prior art devices which do little more than mark the lanes. However, because of its size and shape it permitted the majority of wave energy to pass from one pool lane to another. Additionally, it was difficult to handle and store and expensive to manufacture.

U.S. Pat. No. 4,894,873 discloses a wave suppression device comprised of a cylindrical core having a plurality of fins radially extending from its outer surface. The fins create enclosures which trap water motion, thus creating random turbulent motion which dissipates the viscous forces of water. This device includes a central channel for receiving a cable-like device for stringing a plurality of wave suppression devices together to form a lane demarcation. This device was designed to be sized to match and suppress the waves generated primarily by a swimmer, as well as by ships and the like. It was learned upon application of the device to large waves in harbor and marina areas, however, that the device had limitations. More specifically, it was difficult to maintain a desired buoyancy due to the force and energy of larger waves encountered in such an environment and also due to leaking of water into the interior of the device.

Accordingly, it is the object of the present invention to provide a device which has particular application in harbor and marina areas. More specifically, the buoyancy of the present device may be adjusted to interact in a desirable manner with the waves encountered in a particular harbor or marina environment.

In general, the present invention provides a wave suppression element which is comprised of a cylindrical hollow core having a plurality of fins radiating therefrom and which extend substantially the length of the core. Discs are located at and positioned circumferentially around each end of the core, which discs interconnect with and support the fins. The combination of fins and discs define wave entrapment cavities. Coextensively within the core is a channel for placing a cable or other securing means in which a plurality of elements may be strung.

In a preferred embodiment, the cylindrical core, fins and end disc, are formed from rotationally molded polyethylene, with each element being interconnected to the others and the invention being hollow throughout. A removable plug is located on the exterior of the core and between two (2) fins, which allows water or other material, e.g. sand, to be poured into the hollow interior of the device in order to obtain a desirable buoyancy. The plug is then sealed to make the device water tight and to retain the volume of water poured into the hollow interior of the device.

In a preferred embodiment, a polyethylene pipe is molded into the coextensive cable channel in the core. Further, it is also preferred that both ends of the core channel have threads designed to receive a bushing which, when screwed into the core threading, acts to secure the polyethylene pipe in the core area. In addition, the bushing can act to secure the wave suppression element to the cable or similar stringing means passing through the core channel.

When placed in a series along a cable or other stringing means, the wave suppression element can be prevented from moving along the stringing means through use of splices at various lengths. In addition, the element can be anchored at various points using chains, shackles and concrete blocks.

Other advantages of the invention will become apparent from a perusal of the following detailed description of a presently preferred embodiment of the invention.

PRESENTLY PREFERRED EMBODIMENT OF THE INVENTION

Figure 1:
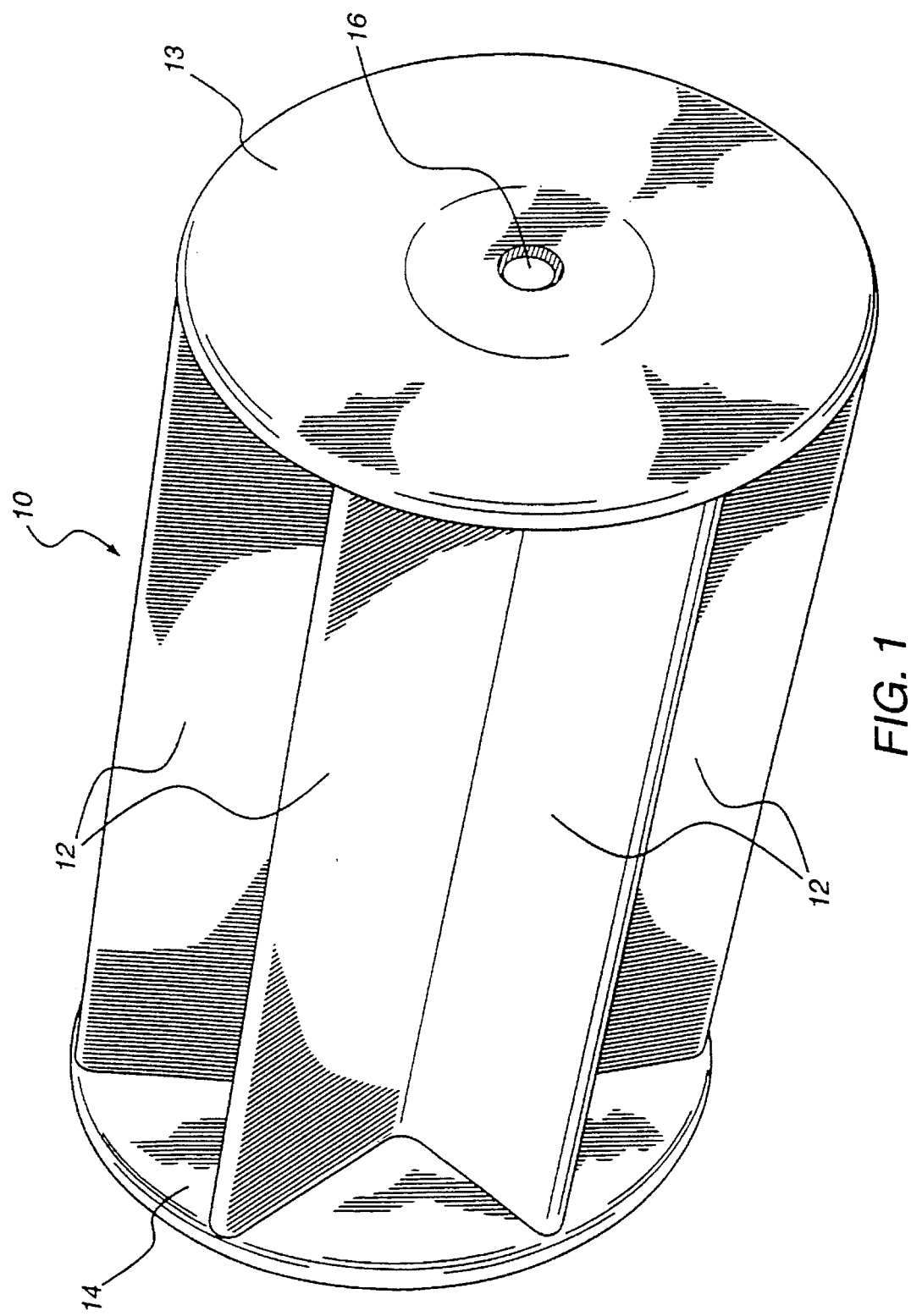
FIG. 1 is a perspective view of the wave suppression element of the present invention.
Figure 2:
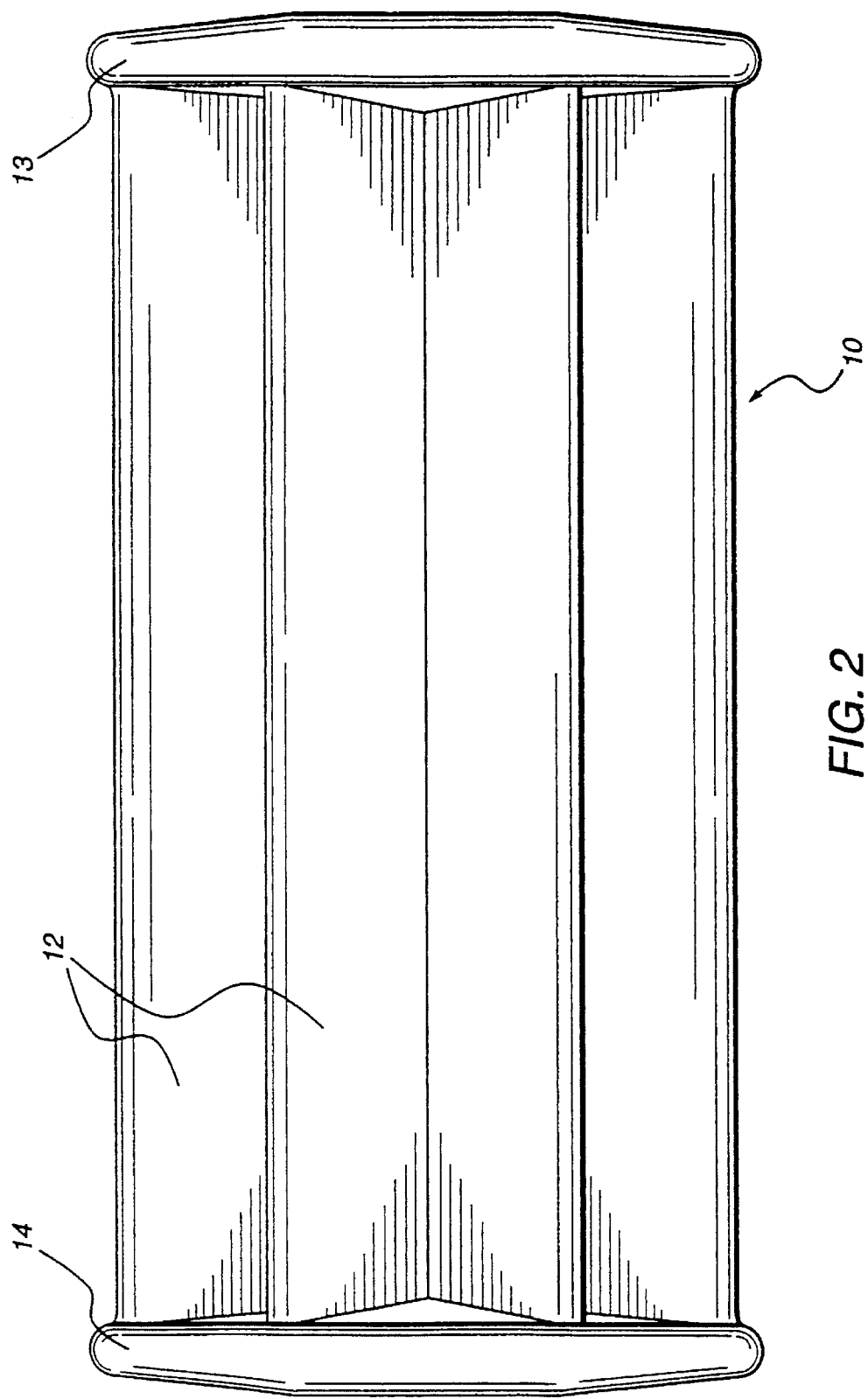
FIG. 2 is a side elevation of the wave suppression element.
Figure 3:
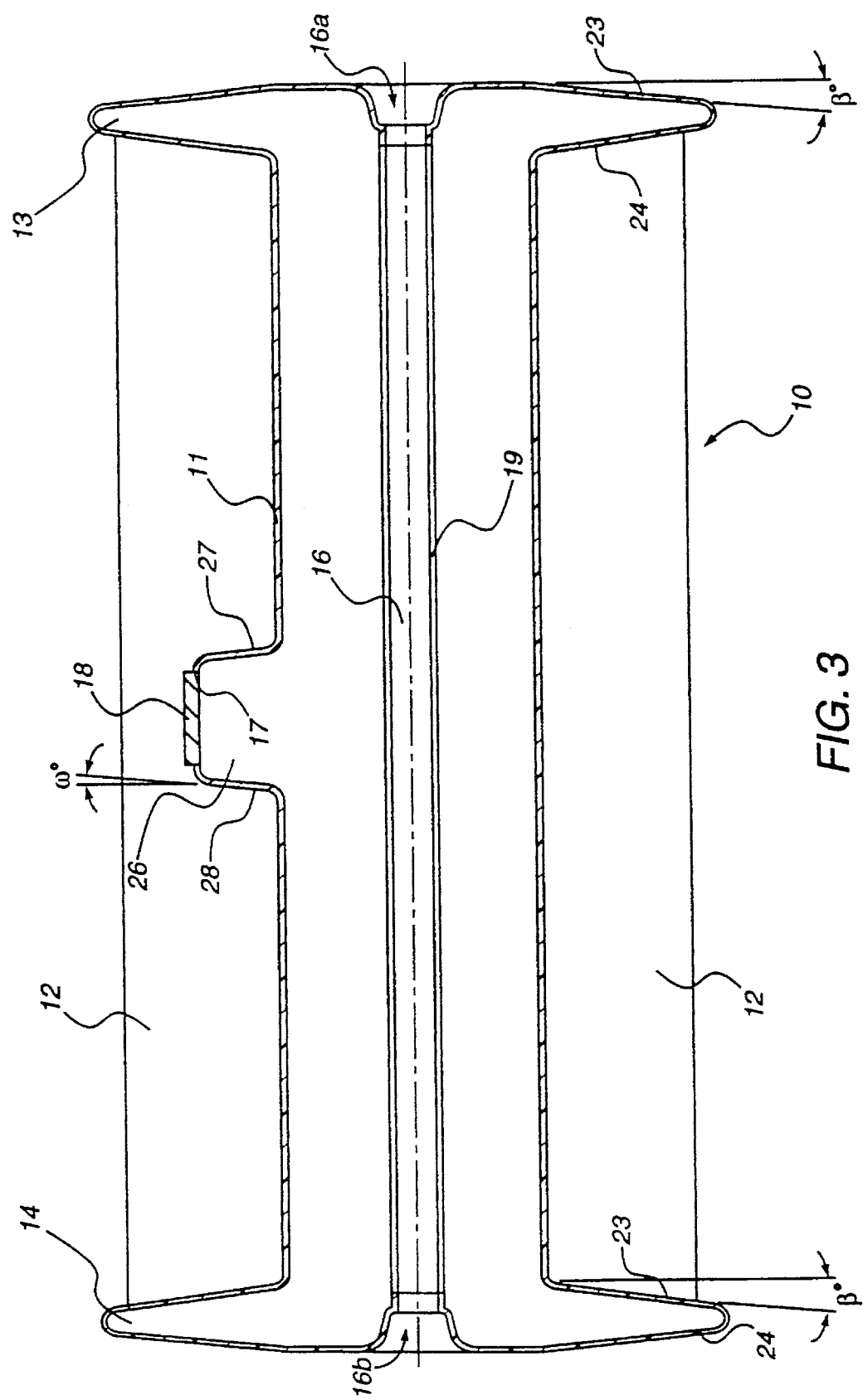
FIG. 3 is a cut-away side elevation of the wave suppression element depicting the core plug of the element.

As shown in FIGS. 1, 2 and 3, the presently preferred embodiment of wave suppression element 10 comprises a cylindrical hollow core 11. Core 11 includes a plurality of fins 12 radially extending outward from core 11. Disc members 13 and 14 are positioned substantially perpendicularly at both ends of core 11 to define a plurality of wave entrapment cavities.

Disc members 13 and 14 provide support to fins 12 in their relative positions as well as imparting wave deflection and entrapment as they impact the fins 12 and core 11 of element 10.

Core channel 16 having channel ends 16a and 16b runs co-extensively along the central length of core 11 and provides a channel for placing a cable or other stringing means in which a plurality of elements can then be strung around a swimming area, harbor or marina to protect such area from ocean waves or waves generated by ship movement adjacent to the protected area.

Figure 4:
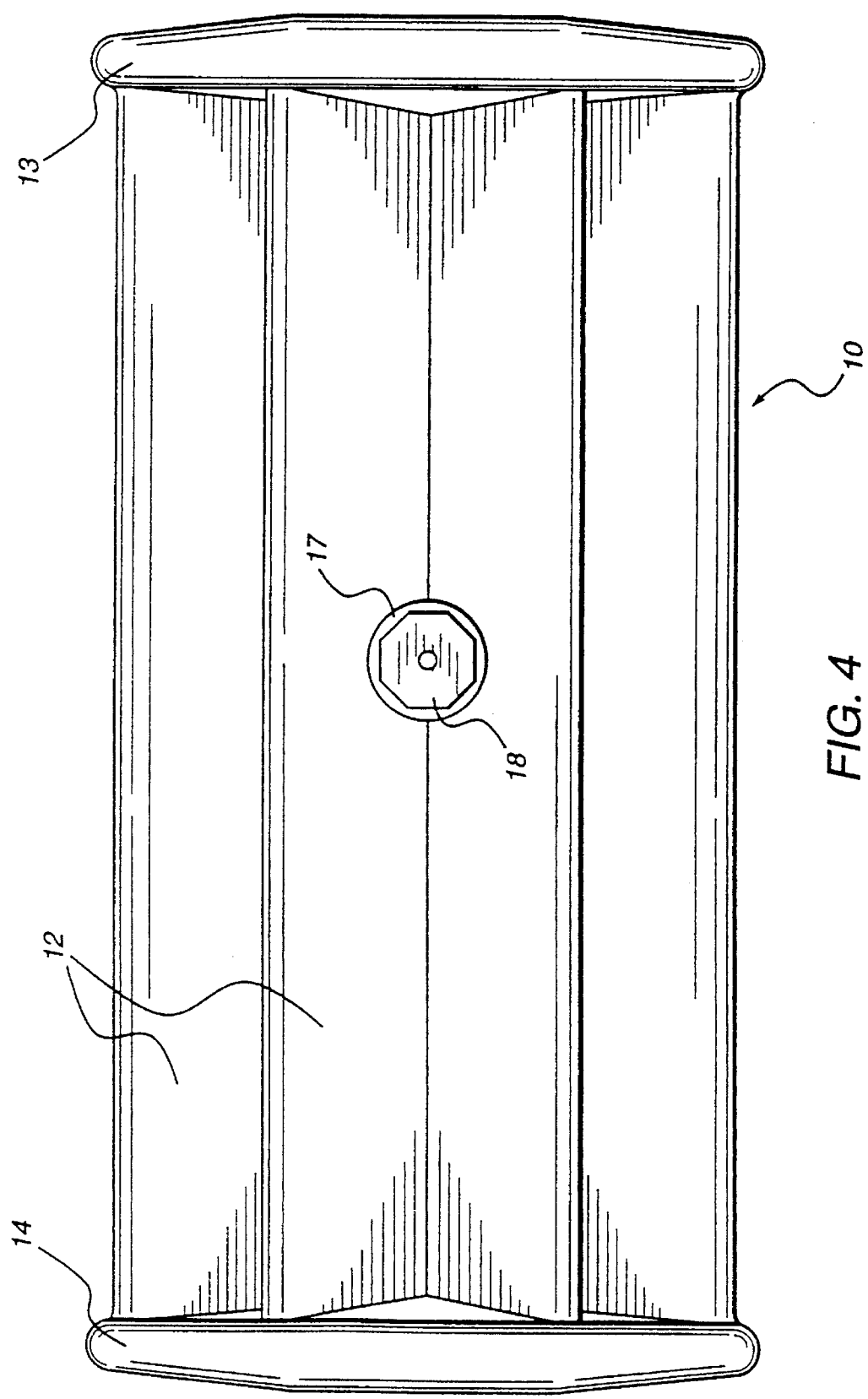
FIG. 4 is a side elevation of the wave suppression element depicting the core plug in relation to the fins of the element.

Referring to FIG. 3 and 4, core 11 contains an additional opening 17 which provides access to the hollow interior of core 11. In a preferred embodiment, opening 17 is located in core 11 midway between disc members 13 and 14 and between two of fins 12. Plug 18 attaches securely within opening 17 to provide a water tight seal. Such attachment may occur by means of screw threading or any other means which allows for such a seal. In operation, plug 18 is removed from opening 17 and water or other filling material such as sand is poured into the hollow area of core 11 in order to provide a desired buoyancy for wave suppression element 10. Plug 18 is then secured within opening 17 so as to prevent the filling material from leaving and water from entering into the hollow area of core 11.

Referring in particular to FIG. 3, tube 19 lies within the length of core channel 16 and provides the channel through which a the cable or other stringing means can pass.

Figure 6:
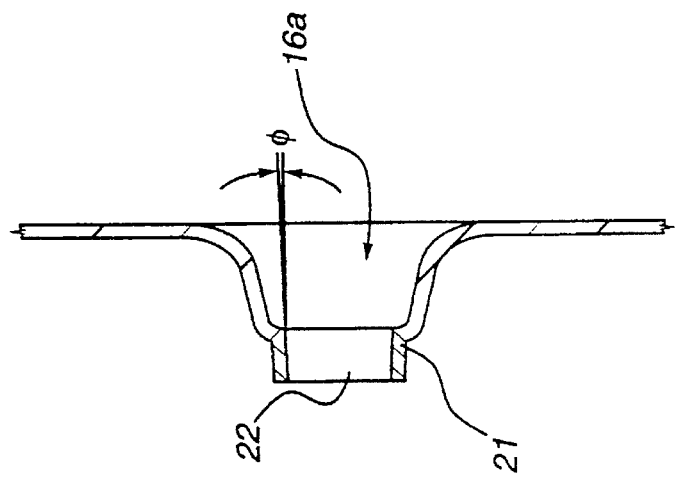
FIG. 6 is a side elevation of the end area of the core opening in the element.
Figure 5:
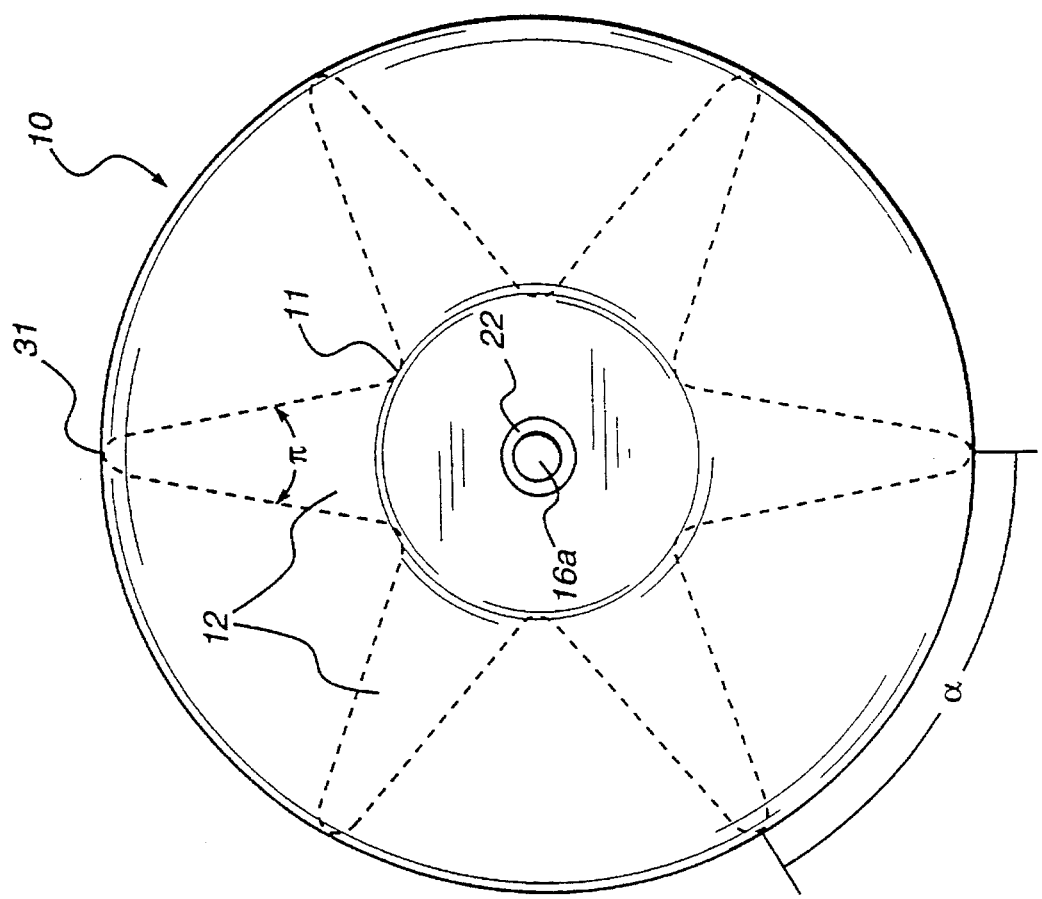
FIG. 5 is an end view of the element shown in FIG. 2.

With reference to FIGS. 5 and 6, channel end 16a contains a threaded area 21 which is designed to receive a cylindrical bushing 22. Bushing 22 acts to position and hold tube 19 within channel 16. Bushing 22 can also be used to provide a means for securing wave suppression element 10 to a cable or other stringing means passing through channel 16. In particular, the walls of threaded area 21 can be sloped inward toward the center of openings 16a, such that the diameter of threaded area 21 decreases as such threaded areas move inward toward channel 16. In a preferred embodiment of the invention, the angle of this scope, as measured with reference to a line drawn parallel to the axis of core 11, is 1.5 degrees. Other degrees of slope may be used, however. This angle is depicted as angle $\phi$ in FIG. 6. As a result, as bushing 22 is screwed into threaded area 21, the bushing is caused to circumferentially compress inward and squeeze against any cable or other stringing means passing through bushing 22.

In the presently preferred embodiment of the invention, core 11, fins 12 and discs numbers 13 and 14 are formed coextensively from rotationally molded polyethylene such that the hollow area of core 11 extends into fins 12 and disc numbers 13 and 14. As detailed in FIG. 3, disc numbers 13 and 14 in the preferred embodiment of the invention have an exterior wall 23 and an interior wall 24, both of which incline inward as the radius of disc numbers 13 and 14 increases to the outer circumference of each disc member. Angle $\beta$, which measures the degree in slope of inclined walls 23 and 24, with reference to a line drawn perpendicular to the length of core 11, is preferably 5 degrees, although other degrees of slope may be used. In addition, the degree of slope of outer wall 24 may differ from that of inner wall 23.

Also with reference to FIG. 3, the preferred embodiment of the device contains a ring 26 which extends upward from core 11 and defines opening 17. Preferably, wall 27 of ring 26 also inclines inward toward opening 17, such that the base 28 of ring 26 has a larger inner diameter than the diameter of opening 17. Angle $\omega$, which measures the degree of slope of this inclination, with reference to a line drawn perpendicular to the length of core 11, also is preferably 5 degrees, although other angles of inclination again may be used.

With reference to FIG. 5, the preferred embodiment of the invention contains six fins 12 which are spaced equidistant from each other at 60 degree angles. Other numbers of fins may be used, with the angle between the top center 31 of adjacent fins 12, angle $\alpha$, varying. In a preferred embodiment, fins 12 are hollow within and slope upwards towards a rounded point, with the angle formed by the inclined walls of fins 12, angle $\pi$, being 22 degrees. Other degrees of angle may be used.

While a presently preferred embodiment of the invention has been shown and described in particularly, the invention may be otherwise embodied within the scope of the appended claims.

What is claimed is:

1. A wave suppressor for use in suppressing large waves formed by ships, tides and wind comprised of
   a. a cylindrical hollow core member having an inner and outer surface, said outer surface having an opening located therein, said opening permitting filling material to enter said hollow of said core member in order to provide a desirable buoyancy to said wave suppressor, and said inner surface defining a central axial opening;
   b. a removable plug which interacts with the opening located within said outer surface of said core member to form a water-fight seal;
   c. a plurality of hollow fins radially extending outward from such core member and positioned substantially coextensively along the length of said core member, with the hollow interior regions of said fins extending into the hollow region of said core member;
   d. two hollow discs circumferentially positioned about and connected to each end of said core member and also to said fins, with the hollow interior regions of said discs extending into the hollow region of said core member so as to form a single hollow interior area within said wave suppressor which is coextensive with said core member, said fins and said discs; and
   e. a tube located within and positioned coextensively along the length of said central axial opening, said tube having a central axial opening for receiving a means for stringing a plurality of wave suppressors together.

2. A wave suppressor as set forth in claim 1, wherein the core member includes at least six fins spaced equidistant from each other.

3. A wave suppressor as set forth in claim 1, wherein said core, fins and discs are formed coextensively from rotationally molded polyethylene.

4. A wave suppressor as set forth in claim 1, wherein said tube is comprised of polyethylene and is molded into said central axial opening.

5. A wave suppressor as set forth in claim 1, wherein the ends of said central axial opening contain threaded areas which act to receive a bushing, said bushing capable of positioning and securing said tube within said central axial opening and also capable of securing said wave suppressor to a cable or other stringing means passing through the channel formed by said central axial opening.

* * * * *